Oct. 29, 1946.  E. M. FARRIS  2,410,277
LUMINOUS MARKER FOR AIRPORTS
Filed Feb. 7, 1945
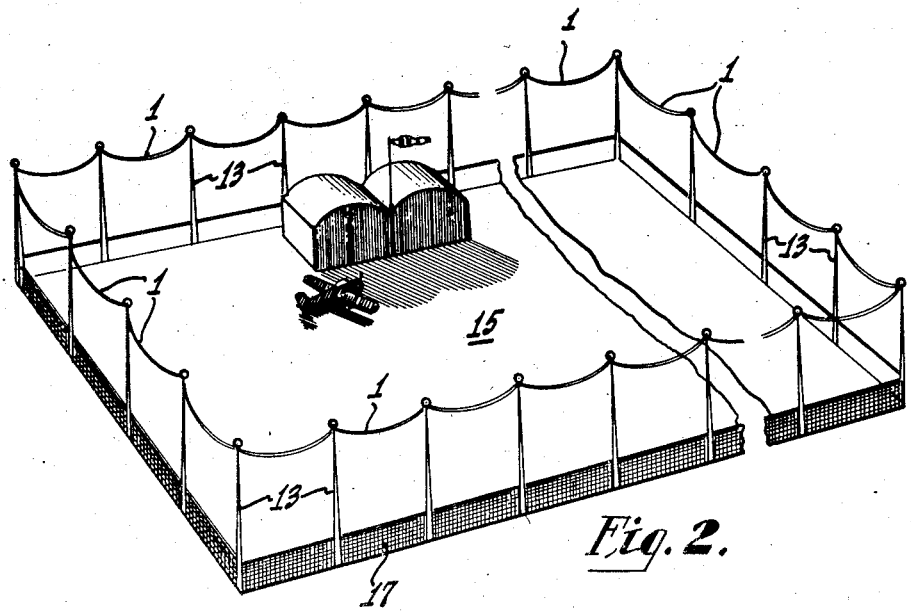
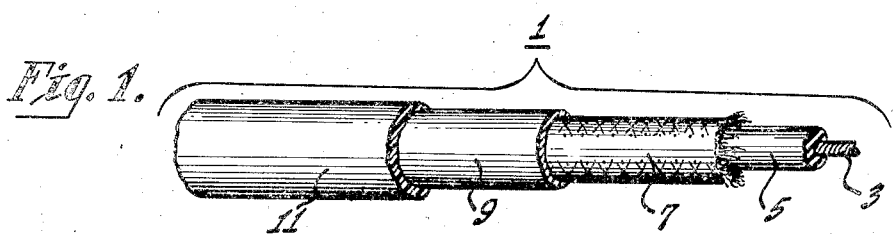
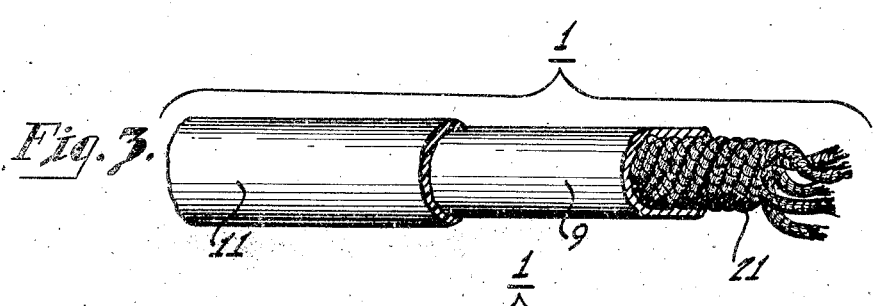
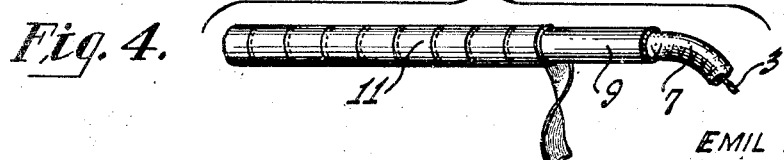
INVENTOR:
EMIL M. FARRIS
BY
ATTORNEY Patented Oct. 29, 1946

2,410,277

UNITED STATES PATENT OFFICE 2,410,277

LUMINOUS MARKER FOR AIRPORTS

Emil M. Farris, Wayne, Pa.

Application February 7, 1945, Serial No. 576,537

5 Claims. (Cl. 250—71)

This invention relates to markers, and more particularly to luminous markers which are especially useful in the dark.

There are many applications of luminous markers in dark places for indicating the location of objects, for defining prescribed areas, and the like. One example of such use is in connection with airports. Most airports are enclosed by a fence or railing having towers rising therefrom or adjacent thereto, and generally there are strung between these towers high tension wires which have been the cause of frequent accidents because they are not clearly visible at night.

When a pilot approaches an airport, he generally circles the field once or twice in order to observe the conditions at the field preparatory to landing. When he has appraised the situation to his satisfaction, he must then devote his attention almost entirely to controlling the throttle, adjusting the stabilizer, setting the rudders, etc. In concentrating on these items, the pilot (particularly if he is a novice) tends to forget the surrounding country, and especially the fact that there are strung between the aforementioned towers high tension wires which are not visible in the dark. Even the customary red warning lights at the tops of the towers are inadequate to help the pilot locate the high tension wires for the reason that the towers are spaced apart a substantial distance and the wires sag more or less. Many accidents have resulted when pilots have run into such wires or similar obstacles.

The primary object of my present invention is to provide an improved, luminous marker which is useful in the dark and has many and varied applications.

More particularly, it is an object of my present invention to provide an improved, luminous marker which is especially useful in connection with airports.

Another object of my present invention is to provide an improved, luminous marker which can be used outdoors and which will have a long life even under the most adverse, climatic conditions.

Still another object of my present invention is to provide an improved, luminous marker as aforesaid which can be fabricated with comparative ease, which is relatively inexpensive in cost, and which is highly efficient in use.

In accordance with my present invention, I provide a marker having a flexible core and a flexible, transparent sheathing around said core. The core may comprise an electro-conductive wire, a non-conductive rope, or any other suitable, flexible material depending upon the particular use or application for my improved marker, and the sheathing comprises a member formed of any one or more of a number of transparent, synthetic resins presently available. Either between the core and the sheathing, or within the sheathing itself, I provide a luminescent material which is clearly visible through the sheathing. Thus, my improved marker can be used effectively in the dark with the luminous material protected from the ambient or other, possibly deleterious forces. Where the core is an electro-conductive member suitable as a high tension wire, it may be used around airports and will be clearly visible to pilots who are about to land, thereby serving as a warning that an obstruction is present.

The novel features that I consider characteristic of my invention are set forth with particularity in the appended claims. The invention itself, however, both as to its organization and method of operation, as well as additional objects and advantages thereof, will best be understood from the following description, when read in connection with the accompanying drawing, in which Figure 1 is a view of one form of flexible marker according to my present invention suitable as a high tension wire, Figure 2 is a perspective view illustrating an airport around which a flexible marker such as that illustrated in Figure 1 may be strung, Figure 3 is a view similar to Figure 1 but showing a modified form of marker in which the core is constituted by a rope, and Figure 4 is a view of still another modification of my improved marker showing a different form of sheathing from that shown in Figures 1 and 3.

Referring more particularly to the drawing, there is shown a marker 1 having a flexible core constituted by an electro-conductive wire or strands of wire 3 covered with a layer of insulation 5 of rubber or the like, in turn covered with one or more layers of fabric 7. The outer layer of fabric 7 is coated with a layer of luminescent material 9 (exaggerated somewhat in the drawing for the sake of clearness). Around the luminescent layer 9, I place a tubular sheathing 11 of flexible, transparent material through which the luminescent material 9 is clearly visible. The entire assembly constitutes an electric cable which can be strung between a plurality of towers 13 which skirt an airport 15 adjacent to a fence 17 around the border thereof. Pilots approaching the airport at night will have no difficulty locating the luminescent, high tension cable 1 and will therefore be able to avoid it when landing. Moreover, it is apparent that the luminescent cable 1 will serve to effectively outline the perimeter of the air field.

The material of the sheathing 11 may be constituted by one or more of several transparent, synthetic resins which are now available. One example of such a resin is polyvinylidene chloride manufactured by the Dow Chemical Company of Midland, Michigan and known commercially as "Saran." This material is especially useful in connection with my improved, luminous cable for the reason that it is not only transparent, but can be extruded in seamless tubes into which the flexible core can be readily inserted. This material also has very great tensile strength, will not absorb moisture, has extreme impermeability to gases, is resistant to nearly all acids, bases, greases and oils, and resists many organic solvents. Furthermore, this particular material, if ignited, it self-extinguishing, and, what is even more important from the standpoint of its use outdoors, it sheds dust and dirt quite readily. Thus, a sheathing of this material will fully protect the luminescent layer 9 and, since it sheds foreign matter, it will remain transparent for clear visibility of the luminescent layer.

Another material which may be used for the flexible sheathing 11 is a rubber hydrochloride manufactured by the Goodyear Tire & Rubber Company, Inc. of Akron, Ohio, under the trade name "Pliofilm." This material also has many of the desirable characteristics mentioned above in connection with "Saran" and can therefore be used to great advantage as a sheathing for my improved cable.

In the form of my invention shown in Figure 3, the flexible core is constituted by a rope or rope-like member 21 on which the layer of luminescent material 9 is applied. The sheathing 11 is then placed over the luminescent layer 9 in any convenient manner. The rope-like member 21 of this form of my invention may be constituted by rope made of fibers, steel or other suitable metal, or the like, or it may be constituted of string, cord, line, etc.

In both forms of the invention shown in Figures 1 and 3, the flexible sheathing 11 is made in the form of a tube which is slipped over the flexible core. The sheathing 11 of Figure 4, on the other hand, may be applied to the flexible core in the form of a strip of flexible, transparent material which is wound in spiral fashion around the flexible core with the edges of adjacent turns of the spiral overlapping each other. The overlapping edges may be bonded to each other by the application of heat and pressure in suitable dies, whereupon the sheathing is formed into one unitary member. With either form of the invention, the luminescent material 9 may be applied either to the outer surface of the core or to the inner surface of the sheathing. If desired, the luminescent material 9 may be dispersed throughout the transparent material 11 in the course of manufacure thereof, in which case there will be no need to apply an additionall layer of luminescent material to the outer surface of the core. In any case, it will be apparent that the luminescent material will be visible through the transparent sheathing.

A luminous, flexible marker such as that described above is useful in many applications. For example, it may be used in theatres as flexible railings to close the aisles when necessary, in open air theatres known as "drive-in" theatres to mark off driving lanes or stalls for the automobiles, or to mark off any other prescribed areas. Also, my improved marker may be used for decorative purposes, for lettering in outdoor advertising devices and signs, etc.

Although I have shown and described several embodiments of my present invention, it will undoubtedly be apparent to those skilled in the art that many other modifications thereof, as well as variations in the particular forms described herein, are possible. I therefore desire that my invention shall not be limited except insofar as is made necessary by the prior art and by the spirit of the appended claims.

I claim as my invention:

1. The combination with an airport skirted by a plurality of towers of a flexible marker connected between said towers, said marker comprising a flexible core constituting a first part, a transparent, flexible sheathing surrounding said core and constituting a second part, and a luminescent material carried by one of said parts and visible through said sheathing.

2. The combination with an airport skirted by a plurality of towers of a high tension cable connected between said towers, said cable comprising a flexible core including an electro-conductive material, said core constituting a first part, a flexible, transparent sheathing surrounding said core and constituting a second part, and a luminescent material carried by one of said parts and visible through said sheathing whereby said cable is adapted to serve as a luminous marker outlining said airport during darkness.

3. The invention set forth in claim 2 characterized in that said luminescent material is interposed between said core and said sheathing.

4. The invention set forth in claim 2 characterized in that said luminescent material is constituted by a coating on the outer surface of said core.

5. The invention set forth in claim 2 characterized in that said luminescent material is constituted by a coating thereof on the inner surface of said sheathing.

EMIL M. FARRIS.